(12) United States Patent
Opshaug et al.

(10) Patent No.: US 9,476,716 B2
(45) Date of Patent: Oct. 25, 2016

(54) METHODS AND APPARATUSES FOR LOCATION-TRIGGERED SENSOR INITIALIZATION

(71) Applicant: QUALCOMM Incorporated, San Diego, CA (US)

(72) Inventors: Guttorm R. Opshaug, Redwood City, CA (US); Manish Kushwaha, San Jose, CA (US); Wyatt Thomas Riley, Chesterbrook, PA (US); Zoltan F. Biacs, San Matteo, CA (US); Mayur N. Shah, Millcreek, WA (US); Joseph Czompo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/072,728

(22) Filed: Nov. 5, 2013

(65) Prior Publication Data
US 2014/0288820 A1     Sep. 25, 2014

Related U.S. Application Data

(60) Provisional application No. 61/804,572, filed on Mar. 22, 2013.

(51) Int. Cl.
| | |
|---|---|
| G01C 21/00 | (2006.01) |
| G01C 21/16 | (2006.01) |
| G01S 19/26 | (2010.01) |
| G01S 19/46 | (2010.01) |
| G01S 19/47 | (2010.01) |

(Continued)

(52) U.S. Cl.
CPC ............ *G01C 21/165* (2013.01); *G01C 21/30* (2013.01); *G01S 19/26* (2013.01); *G01S 19/46* (2013.01); *G01S 19/47* (2013.01); *G01S 19/48* (2013.01); *G01S 19/49* (2013.01); *G01S 5/0252* (2013.01)

(58) Field of Classification Search
CPC ....... G01C 21/00; G01C 21/30; G01S 19/48; G01S 19/46; G01S 19/26; G01S 19/49; G01S 19/47; G01S 5/0252
See application file for complete search history.

(56) References Cited

U.S. PATENT DOCUMENTS 8,311,741 B1 * 11/2012 Lawther et al. .............. 701/527
2003/0182053 A1    9/2003 Swope et al.
(Continued)

FOREIGN PATENT DOCUMENTS

| EP | 2541198 A1 | 1/2013 |
| WO | WO-2004036240 | 4/2004 |

OTHER PUBLICATIONS

International Search Report and Written Opinion—PCT/US2014/031381—ISA/EPO—Jul. 14, 2014.

*Primary Examiner* — John Q Nguyen
*Assistant Examiner* — Alan D Hutchinson
(74) *Attorney, Agent, or Firm* — Berkeley Law & Technology Group, LLP

(57) ABSTRACT

Methods, apparatuses, and devices for generating one or more harsh or diminished radiofrequency environments relative to a planned route of a mobile device user. In one example, a mobile device user a be routed through a harsh or diminished radiofrequency environment based, at least in part, on a sensor suite of a mobile device and/or based on a user's preferences. Prior to entry into such an environment, various sensors may be activated in a manner that permits position estimation in an absence of SPS based positioning signals and/or TPS based positioning signals.

33 Claims, 8 Drawing Sheets

(51) Int. Cl.
*G01S 19/48* (2010.01)
*G01S 19/49* (2010.01)
*G01C 21/30* (2006.01)
*G01S 5/02* (2010.01)

(56) References Cited

U.S. PATENT DOCUMENTS

| | | |
|---|---|---|
| 2007/0152804 A1 | 7/2007 | Breed et al. |
| 2008/0077326 A1 | 3/2008 | Funk et al. |
| 2011/0208430 A1 | 8/2011 | Tun et al. |
| 2011/0257882 A1 | 10/2011 | McBurney et al. |
| 2012/0101728 A1* | 4/2012 | Kudo ............ 701/540 |
| 2012/0182180 A1 | 7/2012 | Wolf et al. |
| 2012/0209519 A1 | 8/2012 | Basnayake |
| 2013/0018581 A1 | 1/2013 | Sidhu et al. |
| 2013/0018629 A1 | 1/2013 | Sidhu et al. |
| 2013/0063308 A1 | 3/2013 | Krasner et al. |
| 2014/0200038 A1* | 7/2014 | Rao .......... H04L 67/2847 455/457 |

* cited by examiner

METHODS AND APPARATUSES FOR LOCATION-TRIGGERED SENSOR INITIALIZATION

CLAIM OF PRIORITY

This application claims priority under 35 USC §119 to U.S. Provisional Application Ser. No. 61/804,572 filed Mar. 22, 2013, and entitled, "METHODS AND APPARATUSES FOR LOCATION-TRIGGERED SENSOR INITIALIZATION," which is assigned to the assignee hereof and which is incorporated herein by reference.

BACKGROUND

1. Field

The subject matter disclosed herein relates to mobile electronic devices, and, more particularly, to methods, apparatuses, and articles of manufacture that may be used in association with generating planned routes on a display device of a mobile electronic device.

2. Information

Global positioning systems (GPSs) and other like satellite positioning systems (SPSs) have enabled navigation services for portable devices that may be used in many types of outdoor environments. For example, GPS navigation devices for use with automobiles may enable drivers to plan precise and efficient routes to destinations as well as obtain accurate predictions of expected times of arrival at destinations. In other examples, GPS devices integrated into handheld communications devices, for example, may enable hikers to avoid becoming disoriented or lost in wilderness environments, as well as providing regular updates of estimated position relative to waypoints and/or important landmarks. Thus, GPS and other like SPS devices have become indispensable in various environments by providing high-quality position estimation as well as a sense of perspective of users' estimated positions within larger contexts.

In some environments, satellites and/or other space vehicles that transmit signals for acquisition by a GPS receiver, for example, may become obscured from view. In one instance, if a GPS mobile device user enters an urban canyon or other environment characterized by dense blocks of structures, a GPS mobile device user may find that he or she is unable to obtain accurate position estimations. Consequently, the mobile user may be unable to plan a route to a destination, and may need to rely on other sensors that may be integrated into the GPS receiver, for example.

SUMMARY

Briefly, particular implementations are directed to a method comprising, at a mobile device, processing acquired satellite positioning system (SPS) signals, terrestrial positioning signals (TPS), or a combination thereof, for use in computing an estimate of a position of the mobile device. The method may further include activating at least one sensor in response to determining that the estimated position of the mobile device is proximate to or approaching a harsh or diminished radio frequency environment, and using measurements obtained at the activated at least one sensor to aid in obtaining a position fix based, at least in part, on acquisition of the SPS signals, the TPS signals, or the combination thereof.

Another particular implementation may be directed to a mobile device comprising one or more sensors to generate position-related signals and one or more receivers to acquire satellite positioning system (SPS) signals and terrestrial positioning system (TPS) signals, or a combination thereof. The mobile device may further comprise one or more processors to process acquired SPS signals for use in computing an estimate of a position of the mobile device and activate at least one of the one or more sensors in response to determining that the estimated position of the mobile device is proximate to or approaching a harsh or diminished radio frequency environment, or that the estimated position is along a planned route that is proximate to a harsh or diminished radiofrequency environment. The one or more processors may additionally apply measurements obtained by the at least one of the one or more sensors to aid in obtaining a position fix based, at least in part, on acquisition of the SPS signals or the TPS signals.

Another particular implementation may be directed to an article comprising a non-transitory storage medium comprising machine-readable instructions stored thereon which are executable by a special purpose computing apparatus of a mobile device to: process acquired satellite positioning system (SPS) signals or terrestrial positioning system (TPS) signals for use in computing an estimate of a position of the mobile device; activate at least one sensor in response to determining that the estimated position of the mobile device is proximate to or approaching a harsh or diminished radio frequency environment or in response to determining that the estimated position is along a planned route that is proximate to a harsh or diminished radio frequency environment; and apply measurements obtained at the at least one sensor to aid in obtaining a position fix based, at least in part, on acquisition of the SPS signals, the TPS signals, or the combination thereof.

Another particular implementation may be directed to an apparatus at a mobile device, comprising means for processing acquired satellite positioning system (SPS) signals and terrestrial positioning system (TPS) signals for use in computing an estimate of a position of the mobile device, means for activating one or more sensors to acquire position-related information in response to determining that the estimated position of the mobile device is proximate to or approaching a harsh or diminished radio frequency environment, and means for using measurements obtained from the one or more sensors to aid in obtaining a position fix based, at least in part, on acquisition of the SPS signals and the TPS signals.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
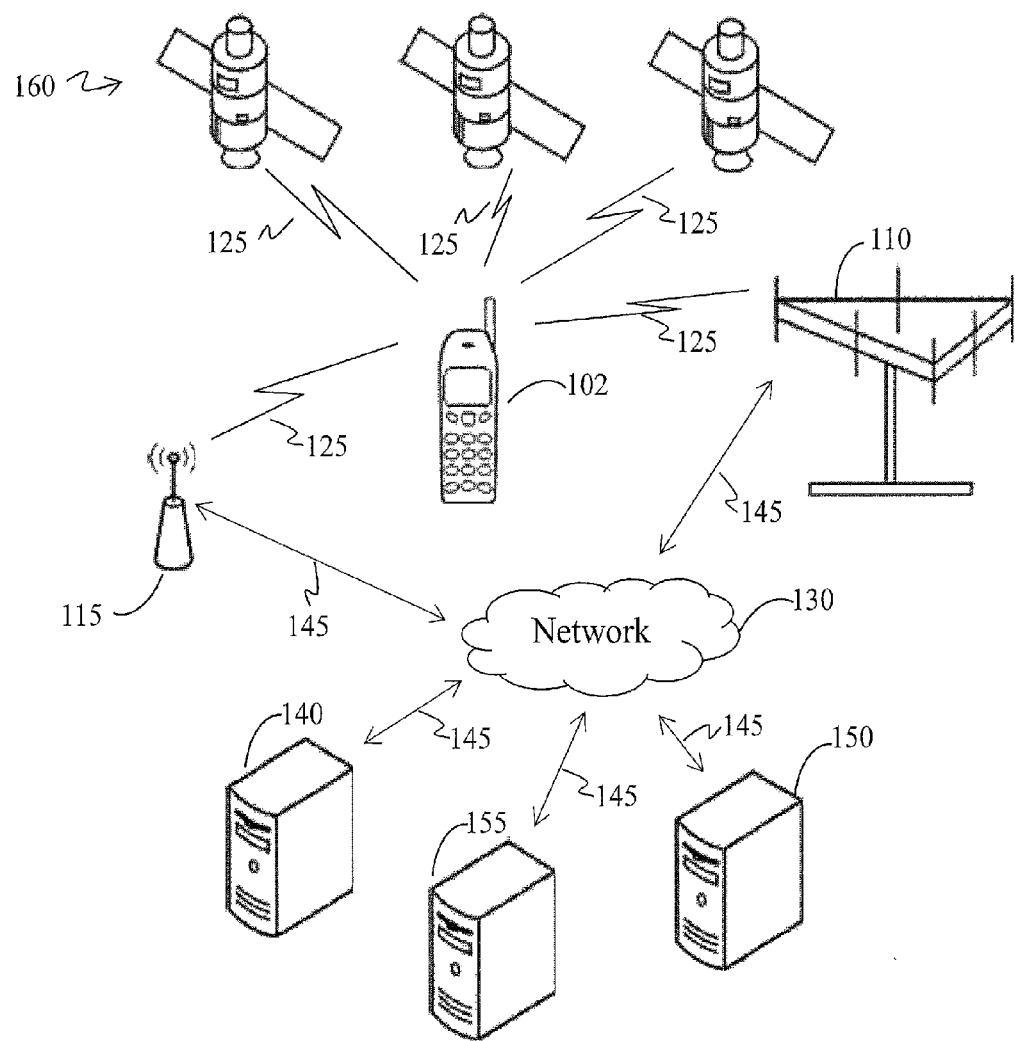
FIG. 1 is a schematic diagram of a network topology according to an embodiment.

In the following detailed description, numerous specific details are set forth to provide a thorough understanding of claimed subject matter. However, those skilled in the art will understand that claimed subject matter may be practiced without these specific details. In other instances, methods, apparatuses, and/or systems that would be known by one of ordinary skill have not been described in detail so as not to obscure claimed subject matter.

As used herein, "mobile electronic device," "mobile device," "wireless device," or the plural form of such terms may be used interchangeably and may refer to any kind of special purpose computing platform or apparatus that may from time to time occupy a position that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be referred to simply as "mobile devices," may include, for example, cellular telephones, smart telephones, personal digital assistants, laptop computers, personal entertainment systems, tablet personal computers, personal audio or video devices, personal navigation devices, or the like. It should be appreciated, however, that these are merely examples of mobile devices that may be used, at least in part, to implement one or more operations and/or techniques for presenting digital maps, such as digital maps showing a planned route for example, and that claimed subject matter is not limited in this respect. It should also be noted that the terms "position" and "location" may be used interchangeably herein. In many instances, a GPS receiver or other like SPS receiver may lose an acquired signal from one or more space vehicles. This may occur, for example, when a mobile user passes beneath a bridge, into a tunnel, or into a congested urban area, such as an urban canyon where one or more of a group of large structures intervenes between a GPS antenna of a portable device and a satellite, for example. In other instances, in-band signals from adjacent transmitters or other sources of electrical noise may interfere with low-level GPS signals. At times, acquiring low-level signals in electrically noisy environments may be further complicated by GPS signals being reflected from adjacent buildings, for example, which may give rise to "multipath" interference in which a reflected signal interferes with a direct signal from an overhead orbiting space vehicle. In instances such as these, a GPS receiver, which may be embedded in a mobile communications device, an automobile navigation system, or integrated into some other platform, may become unusable. Regions wherein GPS signals are subject to signal blockage and attenuation, typically resulting in slower position determination and/or lowered accuracy, and poor signal reception and/or acquisition may be referred to as "harsh" or "diminished" radio frequency environments. A harsh or diminished radiofrequency environment may also be encountered in instances in which, for example, a mobile device employs acquired terrestrial positioning signals. For example, in a crowded downtown area, terrestrial positioning signals (TPS) transmitted from terrestrial transmitters, such as cellular base stations, may also be subject to multi-path, signal attenuation, and other factors that impact the accuracy and/or timeliness of position determination, due to buildings and other structures, which may intervene between a terrestrial transmitter and a mobile device. A harsh or diminished radiofrequency environment may also comprise, for example, areas within which acquired signals may comprise a high bit or symbol error rate or areas within which any other type of phenomena that degrades an ability of the mobile device to acquire positioning signals in a timely manner. A harsh or diminished radiofrequency environment may be determined or inferred from channel energy response measurements and/or channel impulse response measurements, and claimed subject matter is not limited in this respect.

To enable position estimation in a harsh or diminished radiofrequency environment a GPS-equipped mobile communications device, for example, may make use of inertial sensors, which may aid in position estimation during loss-of-signal occurrences. Inertial sensors may include, for example, one or more accelerometers, which may provide output signals representing accelerations in X, Y, and Z dimensions, or may provide output signals characteristic of any other coordinate system, for example. Inertial sensors may additionally include tilt sensors, rotational sensors, shock sensors, vibration sensors, and so forth. Other types of sensors may include gyroscopes, which may measure angular velocity of a mobile device (e.g., pitch, roll, and yaw); magnetometers, which may be used to sense and orientation of a mobile device relative to the Earth's magnetic field; and/or barometric pressure sensors, which may measure changes in altitude of a mobile device. It should be noted, that additional types of sensors may be integrated with, or at least accessible to, a mobile communications device, and claimed subject matter is not limited in this respect.

In implementations, although sensor outputs may be available, for assisting in position estimation of a GPS-equipped mobile device in a harsh or diminished radiofrequency environment, activation of sensors may represent an undesirable strain on battery resources. In other instances, sensor use may represent a burden to processing resource as well as battery resources. For example, if accelerometers are utilized, accelerometer output signals may be mathematically integrated to arrive at a velocity vector. A velocity vector may be mathematically integrated to arrive at a displacement of a mobile device from an initial estimated position. Accelerations, along with one or more mathematically derived quantities (e.g., velocity, displacement) may be accessed by an optimization filter, such as a Kalman filter, which may consume several seconds, or longer, to become operational. Thus, it can be appreciated that use of additional sensors may be undesirable for additional reasons, such as consuming mobile device battery resources, processing resources, and perhaps other resources, and claimed subject matter is not limited in this respect.

In other instances, such as if accelerometers are utilized, accelerometer output signals may be mathematically integrated to arrive at a velocity vector. A velocity vector may be mathematically integrated to arrive at a displacement of a mobile device from an initial estimated position. Accelerometer readings, along with one or more mathematically derived quantities (e.g., acceleration, velocity, displacement, orientation, changes in orientation, etc.) may be accessed by an optimization filter, such as a Kalman filter, which may consume several seconds, or longer, to become operational. The sensors, such as accelerometers, gyros, and magnetometers also consume additional power. Thus, it can be appreciated that use of additional sensors, particularly when the device is not plugged into a charger, may result in consuming added mobile device battery resources, as well as processing resources, bus bandwidth, and perhaps other limited resources. However, these sensors provide added accuracy and a wireless signal-independent source of location information that is particularly useful in harsh or diminished radio frequency environments. Therefore, in areas where good location accuracy may be obtained without sensors, there is benefit to turning sensors off. In harsh or diminished radio frequency environments, there is benefit to turning sensors on to provide non-wireless signal based sources of location information. Managing when sensors are turned on and utilized may be done to optimize and reduce power usage on the mobile device. However, turning on sensors after wireless signals degrade, such as if a mobile device enters a harsh or diminished radio frequency environment, can result in a loss of location accuracy. Turning sensors on before, and in anticipation of, a degraded wireless signal environment may enable a more contiguous transition of location determination from wireless signal based location determination to location determination that depends increasingly heavily on sensors to determine distance and direction of travel and location. In particular, turning sensors on before, and in anticipation of, a degraded wireless signal environment may allow usage of an accurate wireless signal-based location (in good signal environments) as a reference for sensor-based dead reckoning and location determination. Claimed subject matter is not limited in this respect.

In embodiments, a mobile device, such as a GPS-equipped handset, GPS-equipped automobile navigation device, or any other like SPS-equipped device, may make use of a planned route and prior knowledge of the wireless signal environment along the route to indicate whether power should be resumed to (e.g., activated) sensors if encountering a harsh or degraded radiofrequency environment is imminent. In at least one non-limiting example, if a mobile device user receives a planned route to a destination, and if the planned route indicates virtually 100.0% freeway travel, encountering one or more relatively small areas of harsh or degraded radiofrequency environment need not give rise to activation of mobile device sensors. In such instances, for example, activation of one or more sensors, such as gyroscopes, accelerometers, and so forth, may not be critical to for a position estimation application operating on a mobile device. In such instances, updating an expected time of arrival at a destination, providing a capability for turn-by-turn indicators, updating vehicle speed and heading, and so forth may represent inefficient uses of battery and/or computer processing resources.

A mobile device may, for example, place one or more sensors into a preparatory mode at a certain distance or at a certain time from a harsh or degraded radiofrequency environment. In an example, just for the sake of illustration, if a mobile device is traveling at freeway speed and approaching an area representing a harsh or diminished radiofrequency environment, a processor of a mobile device may direct sensors to resume operation (e.g., activate), approximately 3.0 km, for example, prior to approaching the area. If, however, a mobile device is traveling at a much lower speed, a mobile device may direct sensors to resume operation (e.g., activate) perhaps at a distance of approximately 1.0 km, for example, prior to approaching the area. In these instances, and others, a mobile device may direct sensors to resume operation (e.g., activate) in a manner that permits sensors sufficient time to achieve steady-state operation.

A mobile device may, for example, place one or more sensors into a preparatory mode a certain time prior to approaching a harsh or degraded radiofrequency environment. Again, just for the sake of illustration, a mobile device may utilize a current speed to estimate, for example, a time at which power should be resumed (e.g., activated) to one or more sensors. For example, if a gyroscopic sensor consumes approximately 1.0 minute to become operational, and a mobile device is traveling at approximately 60.0 km/h, a mobile device may determine that power should be resumed (e.g., activated) to the gyroscopic sensor approximately 1.0 km from a boundary of a harsh or diminished radiofrequency environment.

In other embodiments, a mobile device may utilize crowd-sourced updates to modify and/or refine a planned route transmitted from a map server, for example, to a mobile device. Thus, if a mobile device user enters or is about to enter a harsh or degraded radiofrequency environment, within which turn-by-turn indicators overlaid on a digital maps may be critical for operation of a position estimation application, a mobile device may activate sensors, such as accelerometers, gyroscopes, and so forth prior to entering the area. In embodiments, this may enable sensors and appropriate processing resources to be made available prior to loss of acquired signals from one or more global navigation satellite system systems (GNSS), such as GPS or other SPS signals, and/or terrestrial positioning signals (TPS) signals, such as signals acquired from cellular base stations, for example. Thus, even if operating within harsh or degraded radiofrequency environments, turn-by-turn indicators, updated speed computations, and updates to an estimated time of arrival may, for example, be provided. It should be noted that additional benefits may be realized by activating sensors prior to entering a harsh or degraded radiofrequency environment, and claimed subject matter is not limited in this respect.

Particular embodiments may additionally provide indications that may be suggestive of presence of a harsh or degraded radiofrequency environment. Indications of a harsh or degraded radiofrequency environment on a digital map may comprise several wireless wide area network (WWAN) towers and/or cellular base stations in close proximity to one another, indications of increased population density, a large density of Wi-Fi access points, or by determining significant multipath signal distortion observed from channel energy response measurements and/or channel impulse response measurements. Other indications may stem from recognizing other features extracted from a digital map, such as a density of tall buildings, etc. It should be noted that additional indications of a harsh or degraded radiofrequency environment may be used, and claimed subject matter is not limited in this respect.

In embodiments, indications that may be suggestive of the presence of a harsh or degraded radiofrequency environment may be "crowd-sourced," for example, based, at least in part, on users of similar mobile devices. In one example, one or more mobile device users in a downtown area may provide measurements and/or indications of loss of signal from GPS or other like SPS signal sources and/or TPS signal sources, along with estimates of one or more locations at which such measurements and/or indications were made, for example. Crowd-sourced measurements and/or indications may further include presence of Wi-Fi hotspots, which may permit a mobile device to estimate its location without acquiring signals from a GNSS, such as GPS or other like SPS signals. Crowd-sourced measurements may additionally supply estimated locations where such measurements and/or indications were made. Crowd-sourced measurements and/or indications may be time-stamped and entered, for example, into a crowd-sourcing server, which may, for example, provide crowd-sourcing modifications to planned routes using a wireless communications channel.

Responsive to obtaining crowd-sourced updates to planned routes and/or in response to obtaining other indications of an approaching harsh or diminished radiofrequency environment, an optimal set of mobile device sensors may be activated to provide sufficient sensor information for accurate location and navigation while managing power. For example, if an approaching harsh or diminished radiofrequency environment comprises a medium-sized area, and if a planned route identifies freeway driving through the harsh or diminished radiofrequency environment, an optimal solution may be, for example, activating or resuming power to a low-power piezoelectric accelerometer, for example. However, if an approaching harsh or diminished radiofrequency environment comprises a relatively large area, and if a planned route identifies neighborhood driving in which turn-by-turn indicators may be critical for operation of a position estimation application, an optimal solution may be, for example, activating or resuming power to a three-axis accelerometer, activating or resuming power to a magnetometer, as well as activating a gyroscopic device. Activating devices may, when used in conjunction with mapping and/or routing information, be used to more accurately match a location to mapping and/or routing information by identifying turns, stops, and other route features.

In embodiments, remaining battery capacity may influence an optimal solution. For example, if battery resources are especially plentiful, or if a mobile device is plugged into a charger, for example, a gyroscopic sensor may be activated or may otherwise resume operation in small or medium-sized harsh or degraded radiofrequency environments. On the other hand, if battery resources are below threshold capacity, an optimal solution may involve maintaining a gyroscopic sensor in a quiescent (e.g., power off) state virtually at all times. Of course, these represent only a few examples of optimal solutions, and claimed subject matter is not so limited.

FIG. 1 is a schematic diagram of a network topology 100 according to an embodiment. As described below, one or more processes or operations for location-triggered sensor initiation may be implemented in a signal environment that may be utilized by a mobile device 102, for example. It should be appreciated that network topology 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), WWAN networks, or the like. It should also be noted that claimed subject matter is not limited to outdoor implementations. For example, at times, one or more operations or techniques described herein may be performed, at least in part, in outdoor or indoor environments, which may include areas having completely unobstructed sky views, partially enclosed areas, as well as substantially enclosed areas. Partially enclosed or substantially enclosed areas may include urban canyons, town squares, amphitheaters, parking garages, rooftop gardens, patios, or the like, and claimed subject matter is not limited in these respects.

As illustrated, network topology 100 may comprise, for example, one or more space vehicles 160, base transceiver station 110, wireless transmitter 115, etc. capable of communicating with mobile device 100 via wireless communication links 125 in accordance with one or more protocols. Space vehicles 160 may be associated with one or more global navigation satellite systems (GNSSs), such as, for example, the United States Global Positioning System (GPS), the Russian GLONASS system, the European Galileo system, as well as any system that may utilize space vehicles from a combination of SPSs, or any SPS developed in the future. Space vehicles 160 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems. Base transceiver station 110, wireless transmitter 115, etc. may be of the same or similar type, for example, or may represent different types of devices, such as access points, radio beacons, cellular base stations, femtocells, or the like, depending on an implementation. At times, one or more wireless transmitters, such as wireless transmitters 115, for example, may be capable of transmitting as well as receiving wireless signals.

In some instances, one or more base transceiver stations 110, wireless transmitters 115, etc. may, for example, be operatively coupled to a network 130 that may comprise one or more wired or wireless communications or computing networks capable of transmitting and receiving messages. Transmitted messages may comprise one or more electronic digital maps, navigation routes, and so forth via one or more wireless communication links 125, 145, etc. As discussed below, items transmitted in messages may include, for example, an electronic digital map depicting roads, intersections, landmarks, and other features that may be provided to a mobile device by a transmitter, such as one or more of servers 140, 150, and 155, at or upon entering the area. In particular implementations, an electronic digital map may indicate areas within which acquiring signals from space vehicles 160 may be problematic due to harsh or diminished radio frequency environment conditions. A harsh or diminished radio frequency environment may include areas of relatively high WWAN cell density, areas of relatively high multipath signal distortion, areas of high population density, areas of relatively high Wi-Fi access point density, and/or areas where imagery may indicate natural or man-made features that may potentially obstruct signals from space vehicles 160, for example.

Even though a certain number of computing platforms or devices are illustrated herein, any number of suitable computing platforms or devices may be implemented to facilitate or to otherwise support one or more techniques or processes associated with network topology 100. For example, at times, network 130 may be coupled to one or more wired or wireless communications networks (e.g., Wi-Fi, etc.) so as to enhance a predominantly indoor coverage area for communications with mobile device 102, one or more base transceiver stations 110, wireless transmitters 115, servers 140, 150, 155, or the like. In some instances, network 130 may facilitate or support femtocell-based operative regions of coverage, for example. Again, these are merely example implementations, and claimed subject matter is not limited in this respect.

Figure 2:
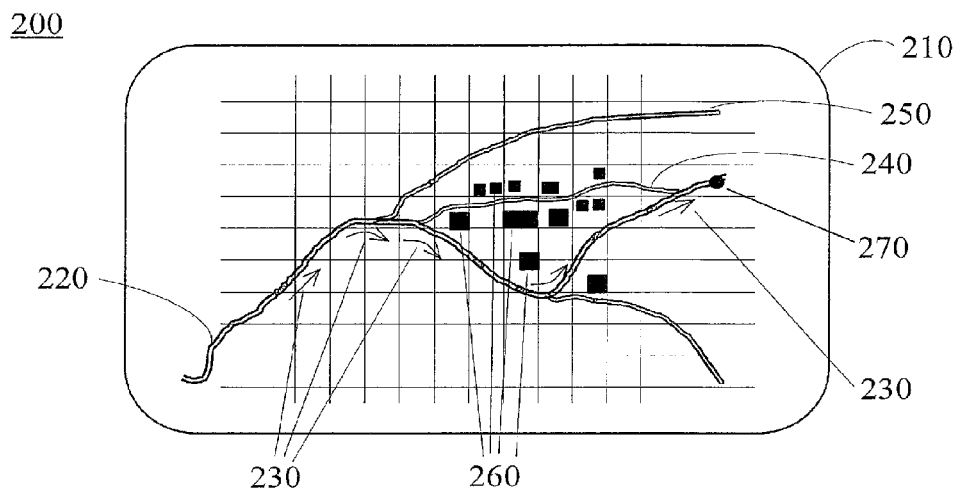
FIGS. 2-3 show an image of a digital map and route presented on a display device according to an embodiment.

FIG. 2 shows an image of a digital map and planned route for presenting on a display device according to an embodiment 200. In implementations, generating images on display device 210 of FIG. 2 may be performed in response to a map server, such as one or more of servers 140, 150, and 155, at least initiating transmitting of a digital map to mobile device 102, for example, by way of wireless network 130 and wireless transmitter 115 of FIG. 1. Responsive to such transmission, mobile device 102 may generate a digital map using display device 210. It should be pointed out, however, that display device 250 may generate a digital map and planned route by way of a wide variety of other means, and claimed subject matter is not limited in this respect.

Display device 210 of FIG. 2 may present an image of a digital map that represents at least a portion of a sequence of streets, highways, and other courses of travel between, for example, an originating point and one or more destinations. In the embodiment of FIG. 2, a planned route may be seen as comprising travel along highway 220 in a manner that bypasses a majority of buildings 260, which may be located along a city street 240, for example. Turn-by-turn indicators 230 may provide directions to a driver, for example, who may be viewing an image of the digital map by way of display device 210. In FIG. 2, a driver of an automobile, for example, may be presented with a planned route, which may perhaps involve nearly exclusive travel along highway 220, or an alternative route, which may involve travel along city street 240, to reach destination 270. It should be noted, however, that although display device 210 may depict only a small number of planned and alternate routes that a mobile device user, such as a driver of an automobile, may follow to reach a destination, claimed subject matter is not limited in this respect. For example, in embodiments, planned and alternate routes may involve turn-by-turn indicators for travel along multiple highways, streets, roads, avenues, expressways, boulevards etc. and claimed subject matter is intended to embrace digital maps depicting all such planned and alternate routes. Additionally, in some embodiments, display device 210 may be dimmed or extinguished completely so that battery resources may be conserved. In instances such as these, turn-by-turn directions may be provided by way of audio cues, for example. In other instances, display device 210 may be dimmed or extinguished completely when proceeding in a forward direction along a long stretch of a highway, for example. In other instances, display device 210 may be dimmed or extinguished to conserve battery resources if a connection to an external audio or a connection to external audio/visual device is available via a Bluetooth connection, for example, and claimed subject matter is not limited in this respect.

Figure 3:
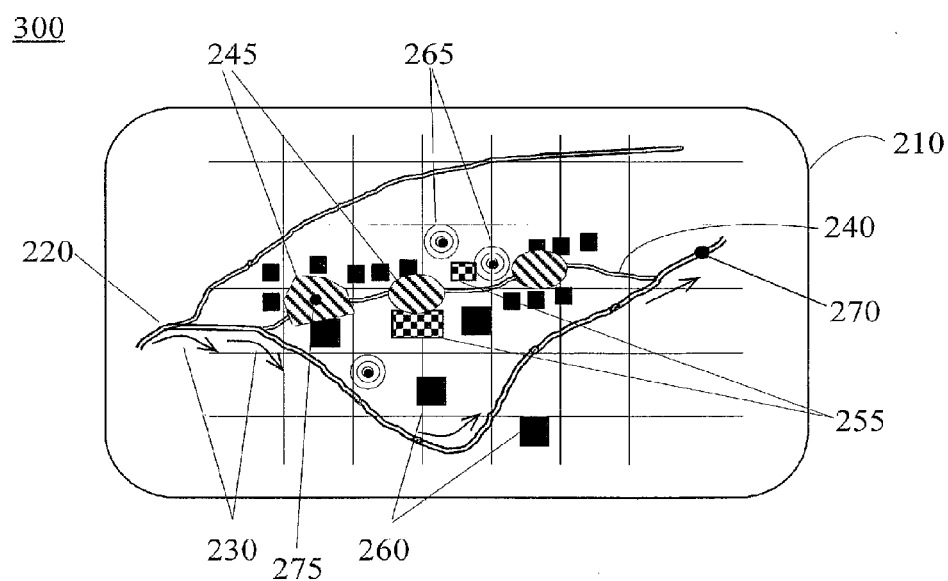

FIG. 3 shows an image of a digital map and planned route presented on a display device according to an embodiment 300. In FIG. 3, display device 210 depicts many of the features depicted on display device 210 of FIG. 2, such as highway 220, turn-by-turn indicators 230, and buildings 260. In addition, display device 210 of FIG. 3 depicts certain additional features, such as areas 245, which may indicate a harsh or diminished radio frequency environment. Within a harsh or diminished radiofrequency environment, such as one or more of areas 245 of FIG. 3, various factors may contribute to a harsh or diminished radio frequency environment, such as a relatively high level of interference from adjacent Wi-Fi access points within Wi-Fi zones 255 (shown using a checkerboard pattern in FIG. 3) and WWAN cells 265. A harsh or diminished radio frequency environment may arise, at least in part, from buildings 260, which may obstruct line of sight signal transmissions from orbiting vehicles of an SPS, for example. It should be noted that additional contributors to a harsh or diminished radio frequency environment may be possible, and claimed subject matter is not limited in this respect.

In embodiments, boundaries of areas 245 may be estimated via crowd-sourcing in which a number of mobile device users within areas 245, for example, report signal dropouts and/or other degradations in GNSS signal quality and/or degradations in TPS signal quality. A crowd-sourcing server (not shown in FIG. 3) may aggregate results of such measurements for transmission to similar users at a later time, for example. In an implementation, crowd-sourcing measurements may be linked with a figure of merit, which may relate, for example, to a time at which crowd-sourced measurements were taken. In one implementation, results of recently performed measurements may be accorded a higher figure of merit than measurements performed in the past. A figure of merit for a crowd-sourced measurement may decrease from a relatively high value, immediately after taking a measurement, to lower values as the measurement ages. In embodiments, a crowd-sourcing server may only make available measurements or indications having a figure of merit that exceeds a particular threshold. In other embodiments, a mobile device may modify a planned route if crowd-sourced measurements exceed a particular threshold, thereby ignoring crowd-sourced measurements having relatively low figures of merit. It should be noted, however, that claimed subject matter is not limited in this respect.

In embodiments, a route server (not shown in FIG. 3) may direct a mobile device user traveling along highway 220 to destination 270 in a manner that avoids city street 240. In some instances, a user may express a preference for avoiding harsh or diminished radiofrequency environments en route to a destination. However, in other instances, a mobile device user may be relatively content with travel within harsh or diminished radiofrequency environments, which may comprise densely populated areas where a user may, for example, experience significant traffic delays. For example, if a mobile device user enjoys spending time in densely populated downtown areas, which may be lined with shops, cafés, boutiques, etc., a user may indicate a preference, such as by making a selection on a user interface of a mobile device, for routing through densely populated, downtown areas. In other instances, if a mobile device user prefers speed and efficiency in traveling to destinations, the user may indicate a preference, via a selection on a user interface of a mobile device, for example, for avoiding harsh or diminished radiofrequency environments, such as heavily populated, downtown areas along city street 240. However, a multitude of preferences may be utilized by a route server to generate planned and alternate routes to a destination, and claimed subject matter is not limited in this respect.

In one or more embodiments, a mobile device may be equipped with sensors, which may operate in place of and/or in addition to GNSS position estimation technology, and/or in place of terrestrial positioning technology. Thus, in embodiments, in the event that a mobile device user, which may be traveling along city street 240 en route to destination 270, for example, may be unable to acquire a signal from a GPS or other SPS transmitter, for example, sensors may be activated to enable a position estimate. Sensors may include one-, two-, or three-axis accelerometers, gyroscopic devices, barometric pressure sensors, magnetometers, and so forth. Accordingly, if a mobile device user expresses a preference for traveling through populated downtown areas, a route server may direct a mobile device user through city street 240 to arrive at destination 270. Consequently, if a mobile device user enters a harsh or diminished radiofrequency environment, such as one or more of areas 245 of FIG. 3, a processor of a mobile device may compute updated estimates of position by utilizing output signals from sensors of the sensor suite.

If, for example, a mobile device is equipped with a smaller sensor suite, such as a single-axis accelerometer, a route server may provide fewer options for planned routes. Thus, in the example of FIG. 3, a mobile device user may be directed to proceed to destination 270 by way of highway 220, thereby avoiding densely populated areas, such as those that may be encountered along city street 240.

In an embodiment, if a mobile device user wishes to travel to a destination within a harsh or diminished radiofrequency environment, such as to destination point 275, for example, a mobile device may resume power to (e.g., activate) one or more sensors in response to determining that a mobile device is approaching, for example, one or more of areas 245. Accordingly, if a mobile device has traveled within a harsh or diminished radiofrequency environment, such as one or more of areas 245 of FIG. 3, for example, the mobile device may accurately estimate position, thereby reducing likelihood that a user will be misdirected to an incorrect location within area 245. In embodiments, a route server may cooperate with a crowd-sourcing server, such as server 430 of FIG. 4, to determine that one or more destinations lies within a harsh or diminished radiofrequency environment, such as one or more of areas 245 of FIG. 3. In response, a route server may direct a mobile device to enter a preparatory condition at or near an estimated location nearby area 245. For example, if destination 275 lies within area 245 of FIG. 3, as a mobile device approaches and intersection of highway 220 and city street 240, a mobile device may direct one or more accelerometers to resume operation (e.g., activate) A mobile device may additionally direct other sensors to activate, such as, one or more barometric pressure sensors, one or more magnetometers, one or more gyroscopic devices, and so forth. Accordingly, upon entering a harsh or diminished radiofrequency environment, such as one or more of areas 245 of FIG. 3, mobile device position estimation may be performed using techniques other than techniques enabled through the acquisition of electromagnetic signals.

Thus, in embodiments, a route server may determine that at one or more portions of a mobile device user's planned route, it may be desirable for the mobile device user to obtain relatively accurate estimations of the location of the mobile device. At other times, for example, a route server may determine that accurate estimates of location may not be critical for operation of a position estimation application. At portions of a planned route at which relatively accurate estimates of position are useful, a route server may direct a mobile device to enter a preparatory condition, which may include activating accelerometers, initiation of a Kalman or other optimization filter, magnetometer calibration, and/or steady-state operation of gyroscopic sensors. Thus, as mobile device user approaches a harsh or diminished radiofrequency environment, such as one or more of areas 245 of FIG. 3, relatively precise turn-by-turn indicators may be provided. At other portions of the planned route, at which relatively accurate estimates of position are not critical for a position estimation and/or a route planning application, a route server may determine that activating a sensor suite of a mobile device is, may represent for example, an unnecessary burden on limited mobile device battery and processing resources.

In some embodiments, a portion, for example, of a downtown area may be defined by a geofence. A geofence may provide a convenient means of identifying areas with in which multiple smaller areas of harsh or diminished radiofrequency environments may be encountered. For example, a geofence may be drawn around portions of city street 240 of FIG. 3 so as to notify a mobile device user that the user may encounter signal dropouts that may negatively impact capability for accurate position estimation. In another embodiment, a cell-specific reference indicator or other identifying signal from a base transceiver station, such as base transceiver station 110 of FIG. 1, may be acquired by a mobile device and used to inform a mobile device of the presence of an area of harsh or diminished radiofrequency performance.

Figure 4:
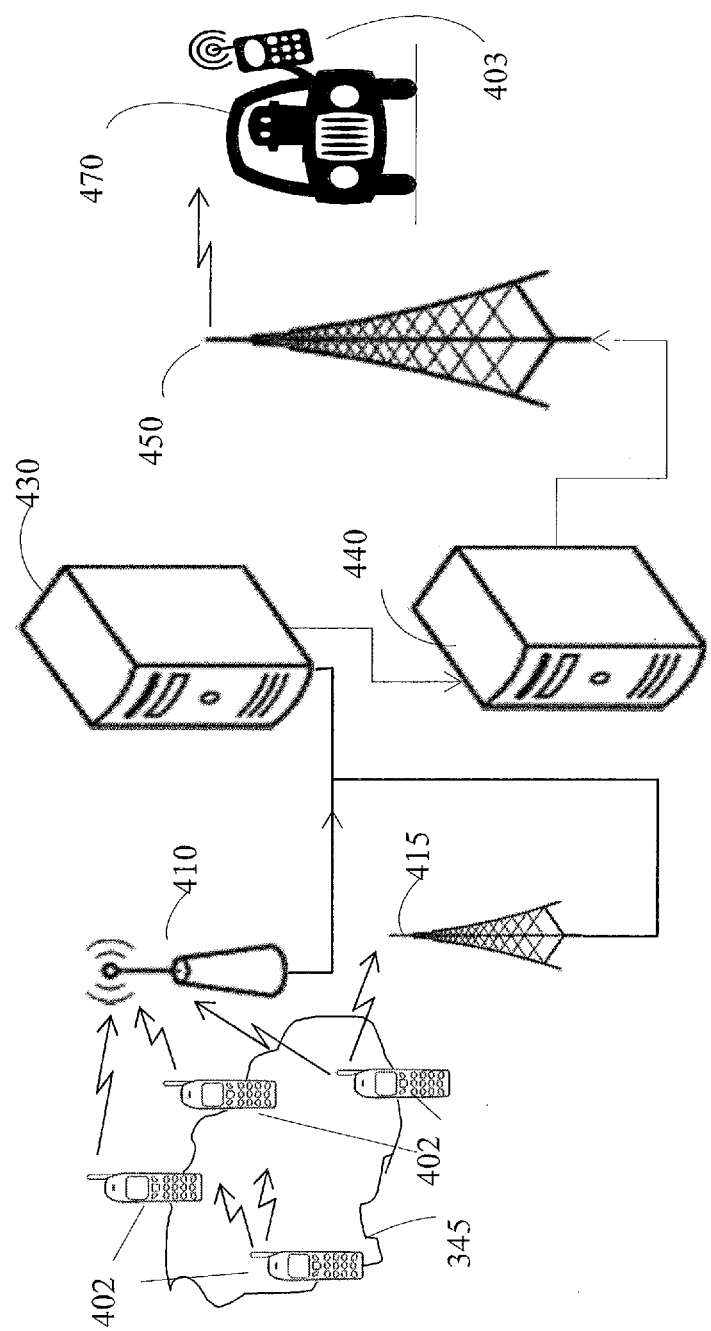
FIG. 4 is a diagram of a system illustrating the use of a crowd-sourcing server and a route server according to an embodiment to effect mobile device routing based upon the presence or absence of harsh or diminished RE environments.

FIG. 4 is a diagram 400 of a system illustrating the use of a crowd-sourcing server and a route server according to an embodiment to affect mobile device routing based upon the presence or absence of harsh or diminished RF environments. In FIG. 4, mobile devices 402 may represent a device similar to mobile device 102 of FIG. 1. Mobile devices 402 may further comprise a sensor for measuring and/or indicating signal strength by a measuring, for example, radiofrequency power received, bit error rate, signal-to-noise ratio, signal distortion observed from channel energy response measurements and/or channel impulse response measurements, or may provide any other indication of a harsh or diminished radiofrequency environment, and claimed subject matter is not limited in this respect.

Measurements and/or other indications of GNSS signal quality may performed by mobile devices 402, which may be positioned at various estimated locations around area 345. Measurements and/or other indications of a harsh or diminished radiofrequency environment, which may be accompanied by position estimates for at least some of mobile devices 402, may be received by wireless access point 410 and/or WWAN tower 415. Crowd-sourced measurements and/or indications may be received from perhaps hundreds, thousands, or greater number of mobile devices, and claimed subject matter is not limited to any particular number of mobile devices 402. Further, crowd-sourced measurements and/or indications may identify a particular base transceiver station, such as WWAN tower 415 or base transceiver station 110 (of FIG. 1), or other positioning resource by way of a cell-specific reference indicator that may be known to delimit a harsh or diminished radio frequency environment. In embodiments, receipt of a large number of signal quality measurements from mobile devices 402 may give rise to crowd-sourcing server 430 forming an irregularly shaped area representing a harsh or diminished radiofrequency environment. Crowd-sourcing server 430 may timestamp signals and, at least in some embodiments, associate received signals with locations on a digital map for presenting on a display device 210, for example.

In embodiments, crowd-sourcing server 430 may assign a figure of merit to received measurements and/or indications of a harsh or diminished radiofrequency environment. For example, more recent measurements and/or indications may be assigned a higher figure of merit, and less recent measurements and/or indications may be assigned a lower figure of merit. In embodiments, crowd-sourcing server 430 may perform a computer-executable method wherein a figure of merit for received indications and/or measurements of a harsh or diminished radiofrequency environment is decreased according to a time between a measurement, for example, and a current time. A mobile device, such as mobile device 402 may receive crowd-sourced measurements and/or indications of a harsh or diminished radiofrequency environment along with figures of merit for at least some measurements and/or indications, for example. In some instances, a mobile device may modify one or more indicators depicted on a planned route shown on a display device of the mobile device. For example, a mobile device may permit indicators, such as turn-by-turn indicators 230, to be modified if crowd-sourced measurements and/or indications of a harsh or diminished radiofrequency environment exceed a threshold figure of merit. Thus, crowd-sourced measurements or indications below a threshold may be discarded or ignored by a mobile device, without modifying one or more planned routes. It should be noted, however, that figures of merit may be based, at least in part, on additional criteria, or altogether different criteria, and claimed subject matter is not limited in this respect.

Route server 440 may communicate with mobile device user 470 who may, at least in some embodiments, be equipped with mobile device 403, which may be similar to mobile device 402, for example. Responsive to interacting with a user interface of mobile device 402, route server 440 may transmit detailed turn-by-turn indicators, for example, to mobile device user 470. Transmission of at least a portion of a planned route from route server 440 to mobile device user 470 may occur by way of WWAN cell tower 450. In embodiments, route server 440 may initially transmit a planned route, or at least a portion thereof, to mobile device user 470 followed by additional features, such as areas representing a harsh or diminished radiofrequency environment. In embodiments, crowd-sourcing server 430 may periodically or occasionally update route server 440 with crowd-sourced GNSS signal strength measurements and/or indications, for example. Such updates may permit mobile device user 470 to be at least occasionally apprised of its proximity to an approaching area representing a harsh or diminished radiofrequency environment, such as area 345, for example. Thus, if boundaries of area 345, for example, change, for example due to changes in atmospheric conditions, temporary reduced levels of adjacent channel interference, a change in an operational status of one or more base stations used in a terrestrial positioning system and/or factors that influence GNSS signal strength, such changes may be depicted on a display device of mobile device 403.

In embodiments, one or more of crowd-sourcing server 430 and route server 440 may provide descriptors for a geofence, which may be used to bound one or more areas of a harsh or diminished radiofrequency environment, such as areas 245. Use of a geofence may, in some embodiments, simplify construction of a digital map for presenting perhaps numerous areas of harsh or diminished radiofrequency signal environment. In such instances, a single geofence, which may span a considerable portion of areas along city street 240 of FIG. 3, may notify a mobile device user of the possible presence of a harsh or diminished radiofrequency environment. In one embodiment, a mobile device may present a notification, such as an audible cue and/or an indicator presented on display device 210, that the mobile device is approaching a geofence. Such notification may, for example, occur at an approximate distance from a geofence, such as approximately 0.5 km, 1.0 km, and so forth, or may occur at an approximate estimated time prior to reaching the geofence, such as approximately 5.0 min., 3.0 min., and so forth.

Figure 5:
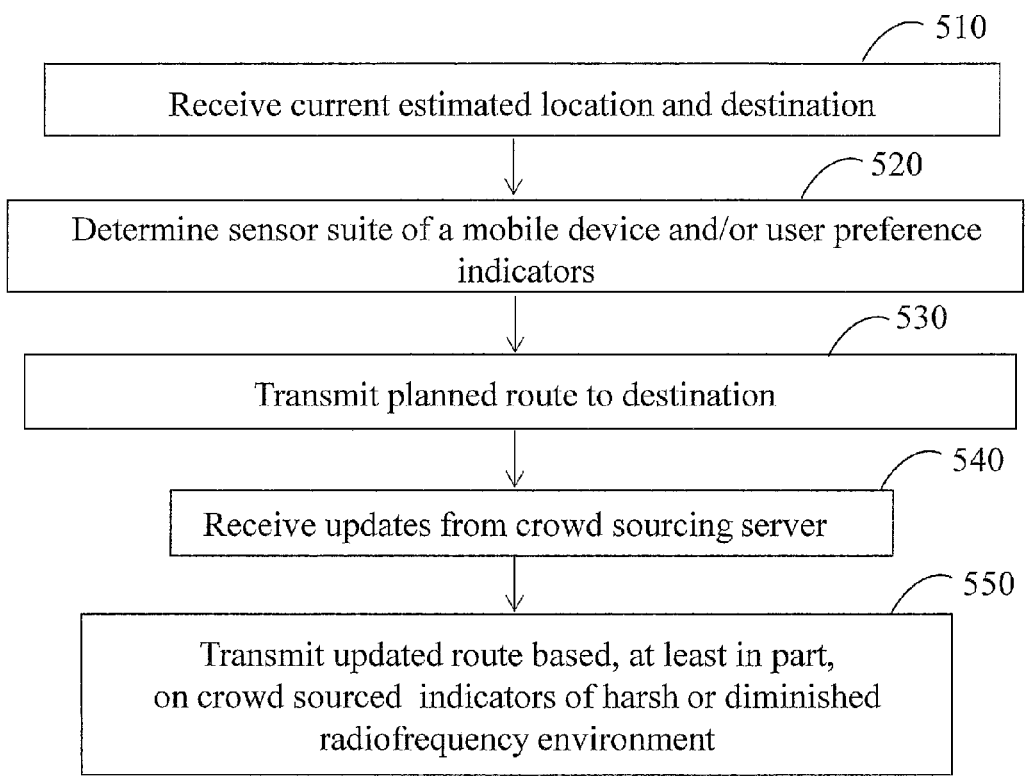
FIG. 5 is flow chart of a process of providing location-triggered sensor initialization according to an embodiment.

FIG. 5 is flow chart 500 of a process of providing a location-triggered sensor initialization according to an embodiment. Although the method of FIG. 5 may be performed by a mobile device cooperating with a route server and a crowd-sourcing server, for example, in embodiments, the method of FIG. 5 may be performed by a mobile device operating without cooperation from a map server, for example. Example implementations, such as described in FIG. 5 and others herein, may include actions or operations in addition to those shown in the blocks of flow chart 500. Example implementations may also include fewer actions or operations, actions or operations occurring in a different order, or any combination thereof.

At block 510, a route server may receive an estimated location and a destination. A mobile device may compute an estimate of its location using any one of the techniques described herein. At block 520, a route server may determine a sensor suite of a mobile device, perhaps by receiving a listing of capabilities of a mobile device, by comparing a received mobile device serial number (e.g., Mobile Subscriber Integrated Services Digital Network-Number, or other identifier), or by way of a combination thereof. In non-limiting examples, a sensor suite may comprise one-, two-, or three-axis accelerometers, barometric pressure sensors, magnetometers, gyroscope devices and claimed subject matter is not limited to particular sensor suites. Block 520 may further comprise receiving user preferences. In embodiments, user preferences may include a user's level of comfort in, for example, driving through densely populated areas, a user's tolerance for traffic delays, etc.

At block 530, a map server may transmit a route to a mobile device user by accessing a wireless communications channel between a WWAN cell tower and a mobile device. At block 540, a route server may receive one or more updates from a crowd-sourcing server. Updates from the crowd-sourcing server may comprise, for example, areas representing harsh or diminished radiofrequency environments. Areas representing harsh or diminished radiofrequency environments may be used by a mobile device to construct boundaries within which location estimates using signals acquired from a GNSS locations may be unlikely or impossible. Areas representing harsh or diminished radiofrequency environments may be suggested or inferred by one or more of a crowd-sourcing server and a route server through knowledge of the number of wireless wide area network (WWAN) towers and/or cellular base stations in close proximity to one another, indications of increased population density, a large density of Wi-Fi access points, or by determining significant multipath signal distortion observed from channel energy response measurements and/or channel impulse response measurements. Additional indicators may be used to suggest harsh or diminished radiofrequency environments, and claimed subject matter is not limited in this respect.

At block 550, an updated route based, at least in part, on crowd-sourced measurements and/or indications of harsh or diminished radiofrequency environments may be transmitted to a mobile device user. Indications may be based, at least in part, on measurements and/or indications obtained by a crowd-sourcing server, inferences of WWAN power density, Wi-Fi hotspot density, indications of multipath signal distortion, and so forth. Block 550 may additionally comprise a mobile device determining, for example, estimate of locations at which sensors are to resume operation (e.g., activate) so as to be available to assist in providing accurate routing to a destination.

Figure 6:
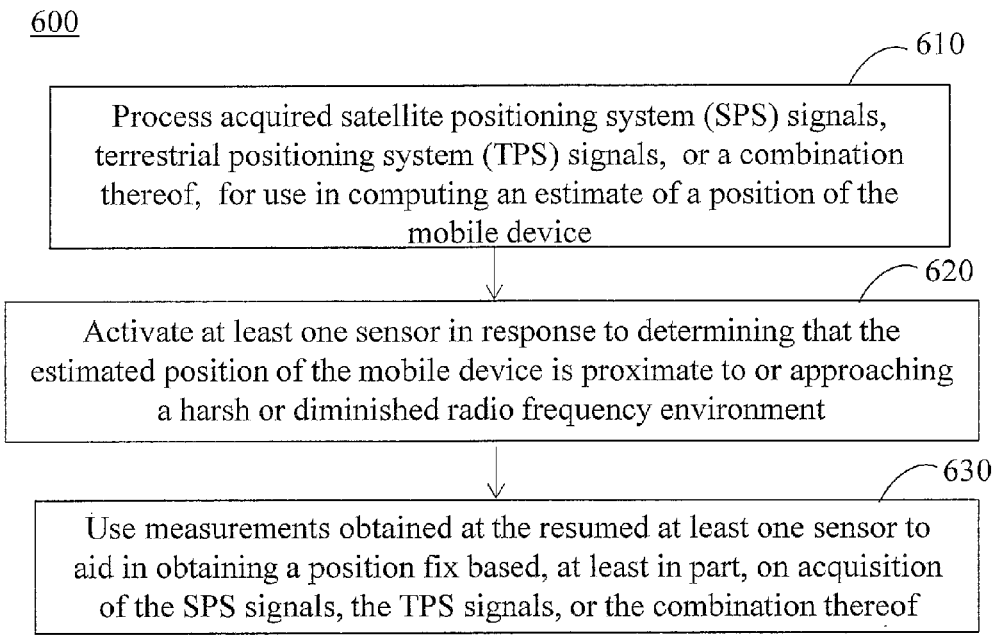
FIG. 6 illustrates a flowchart for a method, performed at a mobile device, for location-triggered sensor initiation according to an embodiment.

FIG. 6 illustrates a flowchart 600 for a method, performed at a mobile device, for location-triggered sensor initiation according to an embodiment. The method of FIG. 6 may be performed, at least in some embodiments, using mobile device 402 of FIG. 4, although alternative mobile devices may be employed, and claimed subject matter is not limited in this respect. The method of FIG. 6 may begin at block 610, which may comprise processing acquired satellite positioning system signals, terrestrial positioning system signals, or a combination thereof, for use in computing an estimate of a position of the mobile device. At block 620, the method may continue by activating at least one sensor in response to determining that the estimated position of the mobile device is proximate to or approaching a harsh or diminished radiofrequency environment. At block 630, the method may continue with using measurements obtained at the resumed (e.g., activated) at least one sensor to aid in obtaining a position fix based, at least in part, on acquisition of the SPS signals, the TPS signals, or the combination thereof.

In an example, just to illustrate block 630, if a mobile device is traveling at freeway speed and approaching an area representing a harsh or diminished radiofrequency environment, a processor of a mobile device may direct sensors to resume operation (or be otherwise activated), approximately 3.0 km, for example, prior to approaching the area. If, however, a mobile device is traveling at a much lower speed, a mobile device may direct sensors to resume operation (e.g., activate) perhaps at a distance of approximately 1.0 km, for example, prior to approaching the area. In another example, to illustrate block 630, a mobile device may utilize a current speed to estimate, for example, a time at which power should be resumed (e.g., reactivated) to one or more sensors. For example, if a gyroscopic sensor consumes approximately 1.0 minute to become operational, and a mobile device is traveling at approximately 60.0 km/h, a mobile device may determine that power should be resumed (e.g., reactivated) to the gyroscopic sensor approximately 1.0 km from a boundary of a harsh or diminished radiofrequency environment.

Figure 7:
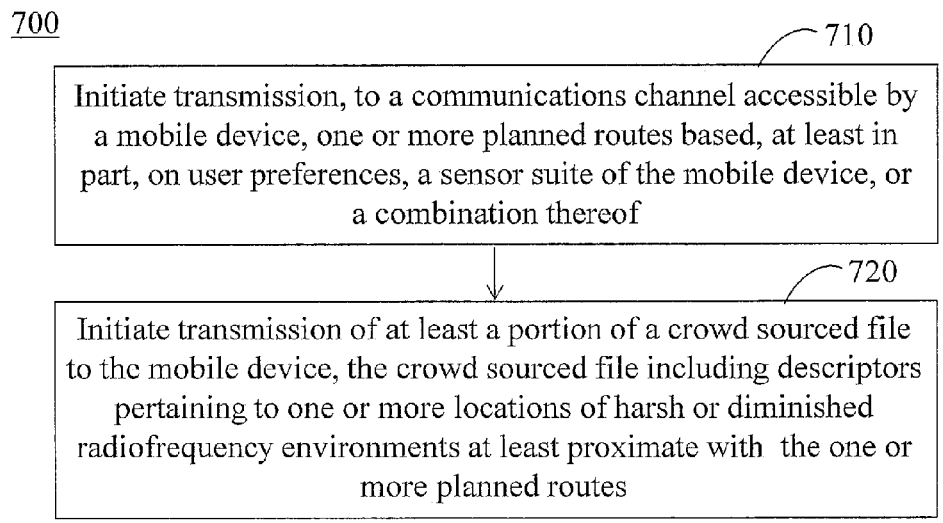
FIG. 7 illustrates a flowchart for a method, performed at a routing server, for location-triggered sensor initiation according to an embodiment.

FIG. 7 illustrates a flowchart 700 for a method, performed at a route server, for location-triggered sensor initiation according to an embodiment. Route server 440 of FIG. 4 may be suitable for performing the method of FIG. 7, although the method may be performed by a variety of alternative processing entities, and claimed subject matter is not limited in this respect. The method may begin at block 710, which may comprise initiating transmission, to a communications channel accessible by a mobile device, one or more planned routes based, at least in part, on user preferences, a sensor suite of the mobile device, or a combination thereof. The method may continue at block 720, which may comprise initiating transmission of at least a portion of a crowd-sourced measurements and/or indications to the mobile device. The crowd-sourced measurements and/or indications pertaining to one or more locations of harsh or diminished radiofrequency environments that are at least proximate with the one or more planned routes.

Figure 8:
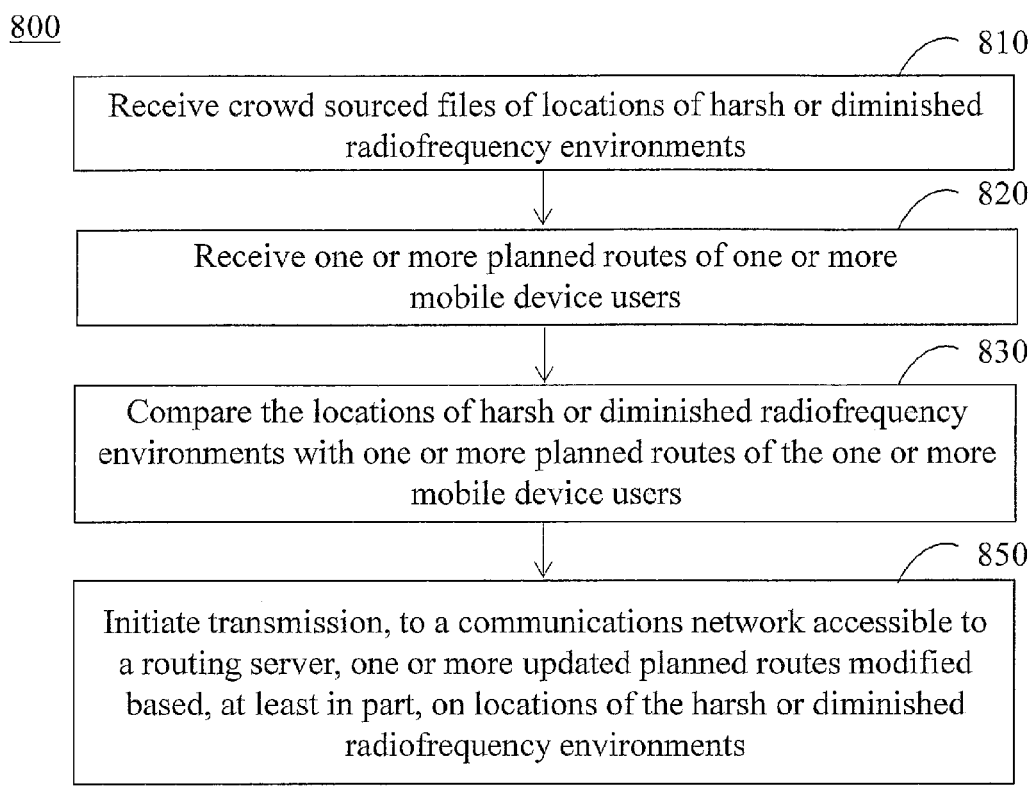
FIG. 8 illustrates a flowchart for a method, performed at a crowd-sourcing server, for location-triggered sensor initiation according to an embodiment.

FIG. 8 illustrates a flowchart 800 for a method, performed at a crowd-sourcing server, for location-triggered sensor initiation according to an embodiment. Crowd-sourcing server 430 may be suitable for performing the method of FIG. 8, although the method may be performed by a variety of alternative processing entities, and claimed subject matter is not limited in this respect. The method may begin at block 810, in which a crowd-sourcing server, for example, may receive crowd-sourced measurements and/or indications of locations of harsh or diminished radiofrequency environments. At block 820, a crowd-sourcing server may receive one or more planned routes from one or more mobile device users. At 830, a crowd-sourcing server may compare locations of harsh or diminished radiofrequency environments with one or more received planned routes of the one or more mobile device users. At block 850, a crowd-sourcing server may initiate transmission to a communications network accessible to a routing server, one or more updated planned routes a modified based, at least in part, on locations of the harsh or diminished radiofrequency environments.

Figure 9:
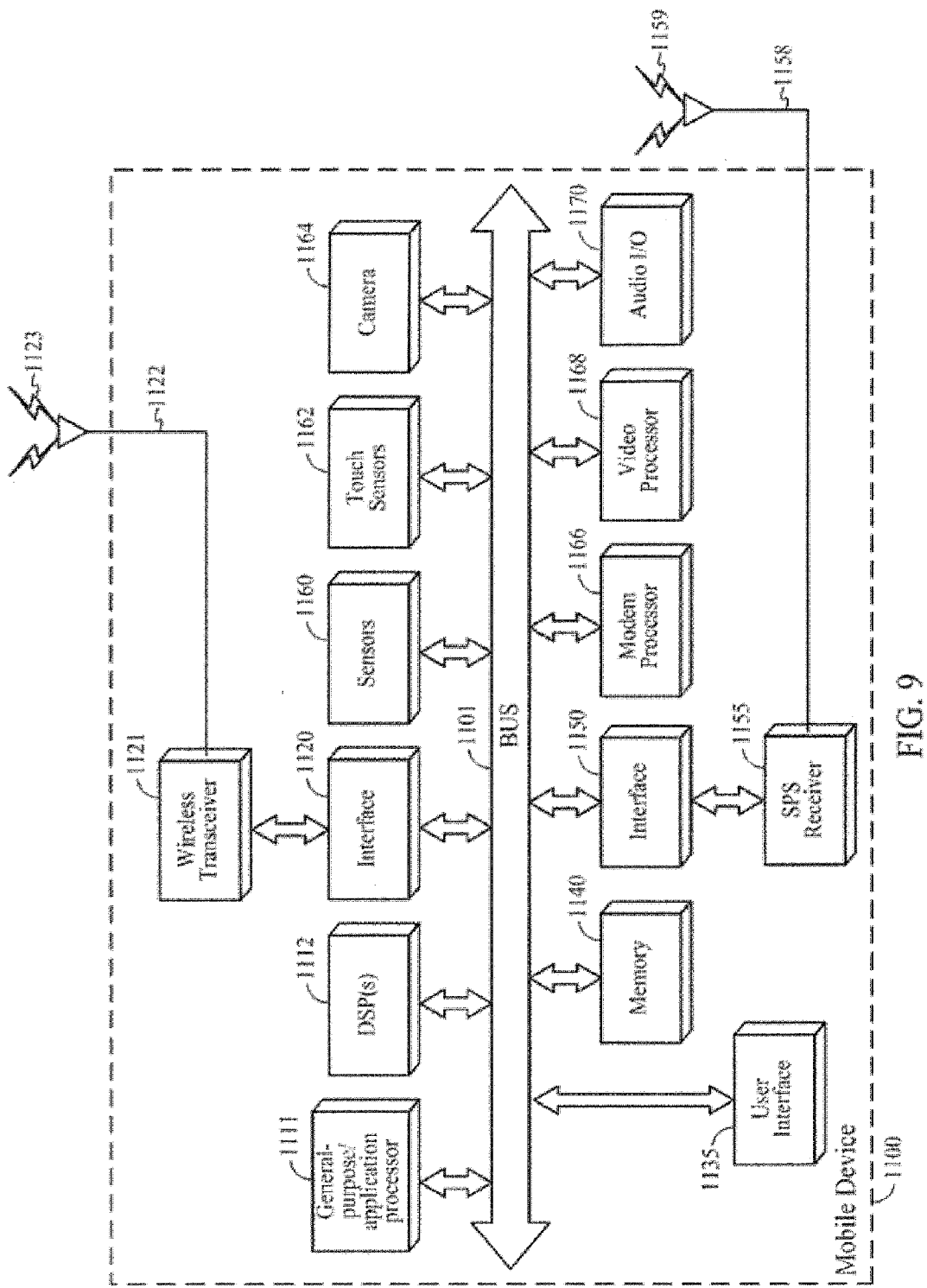
FIG. 9 is a schematic diagram of a mobile device according to an embodiment.

FIG. 9 is a schematic diagram of a mobile device 1100 according to an embodiment. Mobile device 102 (FIG. 1) may comprise one or more features of mobile device 1100 shown in FIG. 9. In certain embodiments, mobile device 1100 may also comprise wireless transceiver 1121, which is capable of transmitting and receiving wireless signals 1123 via antenna 1122 over a wireless communication network. Wireless transceiver 1121 may be coupled to bus 1101 by way of wireless transceiver bus interface 1120. Wireless transceiver bus interface 1120 may, in some embodiments be at least partially integrated with wireless transceiver 1121. Some embodiments may include, for example, multiple wireless transceivers 1121 and wireless antennas 1122 to enable transmitting and/or receiving signals according to corresponding multiple wireless communication standards for Wide Area Networks (WAN), Wireless Local Area Networks (WLAN), Personal Area Networks (PAN), etc. such as, for example, versions of IEEE Std. 802.11, CDMA, WCDMA, LTE, UMTS, GSM, AMPS, Zigbee, and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 9, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable non-transitory storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein.

Also shown in FIG. 9, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general-purpose processor 1111 in response to action from a user. Similarly, applications hosted on mobile device 1100 may store analog or digital signals on memory 1140 to present an output signal to a user. In implementations, a user may interact with user interface 1135 to enter a key word as part of a user initiated query. The query may be transmitted by way of wireless transceiver 1121 to a wireless access point coupled to a map server, for example. Responsive to the query, a server, such as a map server, may respond with indicators pertaining to boundaries of areas corresponding to a harsh or diminished radiofrequency environment. Boundaries of one or more areas of a harsh or diminished radiofrequency environment may be conveyed to a mobile device and processed by video processor 1168 for presenting on a display device. In implementations, areas indicating a harsh or diminished radiofrequency environment may be presented based, at least in part, on a planned route, a sensor suite of a mobile device, or a combination thereof. In another implementation, mobile device 1100 may optionally include a dedicated audio input/output (I/O) device 1170 comprising, for example, a dedicated speaker, microphone, digital to analog circuitry, analog to digital circuitry, amplifiers, and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression, or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101, which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by general purpose application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

In a particular implementation, mobile device 1000 may be capable of performing one or more of the actions set forth in the process of FIG. 7. For example, general-purpose application processor 1111 may perform all or a portion of actions at blocks 610, 620, and/or 630.

Figure 10:
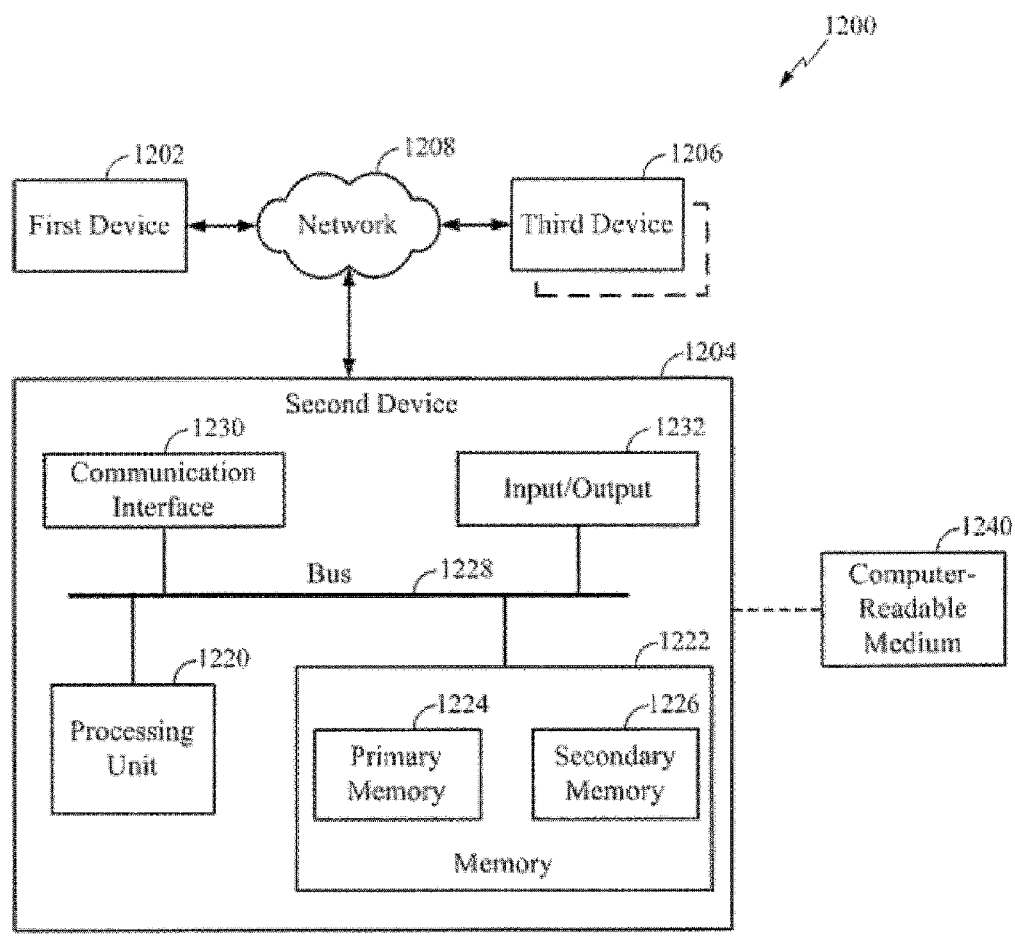
FIG. 10 is a schematic block diagram of an example computing platform according to an embodiment.

FIG. 10 is a schematic diagram illustrating an example system 1200 that may include one or more devices configurable to implement techniques or processes described above, for example, in connection with FIG. 1. System 1200 may include, for example, a first device 1202, a second device 1204, and a third device 1206, which may be operatively coupled through a wireless communications network 1208. In an aspect, first device 1202 may comprise a server capable of providing positioning assistance data such as, for example, a base station almanac. Second and third devices 1204 and 1206 may comprise mobile devices, in an aspect. In addition, in an aspect, wireless communications network 1208 may comprise one or more wireless access points, for example. However, claimed subject matter is not limited in scope in these respects.

First device 1202, second device 1204 and third device 1206, as shown in FIG. 10, may be representative of any device, appliance or machine (e.g., such as wireless transmitter 115 or servers 140, 150 or 155 as shown in FIG. 1) that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, communications network 1208 (e.g., in a particular of implementation of network 130 shown in FIG. 1), may be representative of one or more communication links, processes, or resources configurable to support the exchange of data between at least two of first device 1202, second device 1204, and third device 1206. By way of example but not limitation, communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208. Thus, by way of example but not limitation, second device 1204 may include at least one processing unit 1220 that is operatively coupled to a memory 1222 through a bus 1228. It is recognized that all or part of the various devices and networks shown in system 1200, and the processes and methods as further described herein, may be implemented using or otherwise including hardware, firmware, software, or any combination thereof.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In particular implementation, second device 1204 may be capable of computing an estimated location of a mobile device. For example, second device 1204 may receive parameters in messages receiving from a client STA, receiving STA and/or sending STA through communication network 1208 for use in forming expressions for use in computing an estimated location of the client STA. In certain implementations, a transceiver (not shown) of a second device 1204 may transmit an estimated location of second device 1204 to first device 1202. Responsive to receiving an estimated location, first device 1202 may indicate areas comprising a harsh or diminished radiofrequency environment relative to a planned route of second device 1204 may be transmitted to the second device. Second device 1204 may immediately present relevant areas of harsh or diminished radiofrequency performance by way of a display device (not shown) coupled to, for example bus 1228. Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a non-transitory storage medium.

Second device 1204 may include, for example, a communication interface 1230 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Memory 1222 may represent any suitable or desired information storage medium. For example, memory 1222 may include a primary memory 1224 and a secondary memory 1226. Primary memory 1224 may include, for example, a random access memory, read only memory, etc. While illustrated in this example as being separate from a processing unit, it should be appreciated that all or part of primary memory 1224 may be provided within or otherwise co-located/coupled with processing unit 1220. Secondary memory 1226 may include, for example, the same or similar type of memory as primary memory or one or more information storage devices or systems, such as, for example, a disk drive, an optical disc drive, a tape drive, a solid state memory drive, etc. In certain implementations, secondary memory 1226 may be operatively receptive of, or otherwise enabled to be coupled to, a non-transitory computer-readable medium 1240.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
receiving via a wireless communication signal, from a route server that is separate and external to the mobile device, at least a portion of a planned route to a pre-determined destination, said received at least said portion of said planned route comprising indicators for travel within a location of at least one harsh or diminished radio frequency environment;
said received at least said portion of said planned route comprising an instruction to activate at least one sensor if an estimated position of said mobile device is proximate to or approaching said location of at least one harsh or diminished radio frequency environment;
processing acquired satellite positioning system (SPS) signals, terrestrial positioning system (TPS) signals, or a combination thereof, for use in computing said estimated position of said mobile device;
said mobile device activating, said at least one sensor in response to said instruction based, at least in part, on a determination that said estimated position of said mobile device is proximate to or approaching said location of at least one harsh or diminished radio frequency environment; and
using measurements obtained at said activated at least one sensor to aid in obtaining a position fix within said location of at least one harsh or diminished radio frequency environment.

2. The method of claim 1, and further comprising:
using said measurements obtained by said activated at least one sensor to aid in obtaining said position fix based, at least in part, on said received at least said portion of said planned route indicating that an accurate estimated position of said mobile device is critical for operation of a position estimation application.

3. The method of claim 2, and further comprising:
maintaining said at least one sensor in an unpowered state if said received at least said portion of said planned route indicates that said accurate estimated position of said mobile device is not critical for operation of said position estimation application.

4. The method of claim 2, and further comprising:
maintaining said at least one sensor in an unpowered state based, at least partially in response to receiving a user selection of a route that traverses densely populated areas, experiences traffic delays, or a combination thereof.

5. The method of claim 1, and further comprising:
determining that said estimated position of said mobile device is proximate to or approaching said location of at least one harsh or diminished radio frequency environment, or that said estimated position is along said received at least said portion of said planned route that is proximate to said location of at least one harsh or diminished radio frequency environment, said determining being based, at least in part, on one or more of:
crowd-sourced measurements or indications;
detection of a WWAN cell density;
channel energy or channel impulse responses for WWAN signals or GNSS signals;
a population density map;
a Wi-Fi access point density map; or
inspection of imagery features on a digital map.

6. The method of claim 1, wherein said at least one sensor comprises an accelerometer.

7. The method of claim 1, wherein said at least one sensor comprises a gyroscope.

8. The method of claim 1, wherein said at least one sensor comprises a magnetometer.

9. The method of claim 1, wherein said at least one sensor comprises a barometric pressure sensor.

10. The method of claim 1, and further comprising:
determining that said estimated position of said mobile device is proximate to or approaching said location of at least one harsh or diminished radio frequency environment by application of said estimated position to a geofence.

11. The method of claim 1, and further comprising:
acquiring an identifying signal indicating that said estimated position of said mobile device is proximate to or approaching a cellular base station known to delimit said location of at least one harsh or diminished radio frequency environment.

12. The method of claim 1, and further comprising:
determining an extent of said location of at least one harsh or diminished radiofrequency environment; and
selecting a set of sensors to be activated based, at least in part, on said determined extent of said location of at least one harsh or diminished radio frequency environment.

13. The method of claim 1, and further comprising:
determining an estimated distance or an estimated time to reach said location of at least one harsh or diminished radio frequency environment; and
placing said at least one sensor into a preparatory condition based, at least in part, on said estimated distance or said estimated time.

14. The method of claim 1, and further comprising:
receiving one or more crowd-sourcing updates to said received at least said portion of said planned route over a wireless communications channel.

15. The method of claim 1, wherein said indicators for travel comprise one or more turn-by-turn indicators provided at one or more locations within said at least one harsh or diminished radio frequency environment.

16. The method of claim 15, wherein said instruction to activate said at least one sensor is based, at least in part, on a determination that said received at least said portion of said planned route comprises said one or more turn-by-turn indicators at one or more locations within said at least one harsh or diminished radio frequency environment.

17. The method of claim 1, wherein said activating said at least one sensor is based, at least in part, on available battery resources of said mobile device not being below a threshold capacity.

18. A mobile device comprising:
one or more sensors;
one or more receivers to acquire satellite positioning system (SPS) signals and terrestrial positioning system (TPS) signals, or a combination thereof, said one or more receivers additionally to receive via a wireless communication signal, from a route server that is separate and external to the mobile device, at least a portion of a planned route to a pre-determined destination, said received at least said portion of said planned route to comprise indicators for travel within a location of at least one harsh or diminished radio frequency environment, said received at least said portion of said planned route additionally to comprise an instruction to activate at least one sensor of said one or more sensors if an estimated position of said mobile device is proximate to or approaching said location of at least one harsh or diminished radio frequency environment; and
one or more processors of the mobile device configured to:
process said acquired SPS signals for use in computing said estimated position of said mobile device;
determine that said estimated position of said mobile device is proximate to or approaching said location of at least one harsh or diminished radio frequency environment;
activate said at least one sensor in response to said instruction and based, at least in part, on a determination that said mobile device is proximate to or approaching said location of at least one harsh or diminished radio frequency environment; and
apply measurements obtained by said at least one sensor of said one or more sensors to aid in obtaining a position fix within said location of at least one harsh or diminished radio frequency environment.

19. The mobile device of claim 18, wherein said one or more processors are additionally configured to:
update said received at least said portion of said planned route based, at least in part, on one or more crowd-sourced measurements or indications.

20. The mobile device of claim 18, wherein said at least said portion of said received planned route comprises a digital map showing one or more WWAN cells, population density, and Wi-Fi access point density.

21. The mobile device of claim 18, wherein said one or more processors are additionally configured to:
receive, from a user interface, an input signal representing a route preference, said route preference being based, at least in part, on a user's tolerance for traveling within a harsh or diminished radio frequency environment.

22. The mobile device of claim 21, wherein said one or more processors are additionally configured to:
direct a display device of said mobile device to present at least portions of at least two planned routes to said pre-determined destination based, at least in part, said input signal from said user interface.

23. The mobile device of claim 22, wherein said one or more processors are additionally configured to:
direct said display device of said mobile device to present at least portions of said at least two planned routes to said pre-determined destination based, at least in part, on a sensor suite of said mobile device.

24. An article comprising:
a non-transitory storage medium comprising machine-readable instructions stored thereon which are executable by a special purpose computing apparatus of a mobile device to:
obtain via a wireless communication signal, from a route server that is separate and external to the mobile device, at least a portion of a planned route to a pre-determined destination, said obtained at least said portion of said planned route to comprise indicators for travel within a location of at least one harsh or diminished radio frequency environment, said obtained at least said portion of said planned route additionally to comprise an instruction to activate at least one sensor if an estimated position of said mobile device is proximate to or approaching said location of at least one harsh or diminished radio frequency environment;
process acquired satellite positioning system (SPS) signals or terrestrial positioning system (TPS) signals for use in computing said estimated position of said mobile device;
determine that said estimated position of said mobile device is proximate to or approaching said location of at least one harsh or diminished radio frequency environment;
the mobile device to activate said at least one sensor in response to said instruction based, at least in part, on a determination that said mobile device is proximate to or approaching said location of at least one harsh or diminished radio frequency environment; and
apply measurements obtained at said activated at least one sensor to aid in obtaining a position fix within said location of at least one harsh or diminished radio frequency environment.

25. The article of claim 24, wherein said non-transitory storage medium comprises machine-readable instructions stored thereon which are executable by said special purpose computing apparatus to:
modify said at least said portion of said planned route based, at least in part, on one or more crowd-sourced measurements or indications.

26. The article of claim 24, wherein said non-transitory storage medium comprises machine-readable instructions stored thereon which are executable by said special purpose computing apparatus to:
determine whether to activate said at least one sensor in response to determining that an accurate measurement of said estimated position within said location of at least one harsh or diminished radio frequency environment is critical for operation of a position estimation application along said at least said portion of said planned route.

27. The article of claim 26, wherein said at least a portion of said planned route comprises a digital map showing one or more WWAN cells, population density, or Wi-Fi access point density.

28. The article of claim 24, wherein said non-transitory storage medium comprises machine-readable instructions stored thereon which are executable by said special purpose computing apparatus to:
direct a display device of said mobile device to receive an input that represents a mobile device user's route preference, said mobile device user's route preference being based, at least in part, on a user's tolerance for traveling to a destination within a harsh or diminished radio frequency environment.

29. An apparatus at a mobile device, comprising:
means for receiving via a wireless communication signal, from a route server that is separate and external to the mobile device, at least a portion of a planned route to a pre-determined destination, said received at least a portion of said planned route comprising indicators for travel within a location of at least one harsh or diminished radio frequency environment, said received at least said portion of said planned route comprising an instruction to activate one or more sensors if an estimated position of said mobile device is proximate to or approaching said location of at least one harsh or diminished radio frequency environment;
means for processing acquired satellite positioning system (SPS) signals and terrestrial positioning system (TPS) signals, or a combination thereof, for use in computing said estimated position of said mobile device;
means for activating at least one of said one or more sensors in response to said instruction and based, at least in part, on a determination that said mobile device is proximate to or approaching said location of at least one harsh or diminished radio frequency environment; and
means for using measurements obtained from said one or more sensors to aid in obtaining a position fix within said location of at least one harsh or diminished radio frequency environment.

30. The apparatus of claim 29, further comprising:
means for using said measurements obtained from said one or more sensors to aid in obtaining said position fix based, at least in part, on acquisition of said SPS signals and said TPS signals if said received at least said portion of said planned route indicates that accurate estimated position of said mobile device is critical for operation of a position estimation application.

31. The apparatus of claim 29, further comprising:
means for maintaining said one or more sensors in an unpowered state if said received at least said portion of said planned route indicates that accurate position estimates of said mobile device are not critical for operation of a position estimation application.

32. The apparatus of claim 29, further comprising:
means for determining that said estimated position of said mobile device is proximate to or approaching said location of at least one harsh or diminished radio frequency environment, or that said estimated position is along said received at least said portion of said planned route is proximate to said location of at least one harsh or diminished radio frequency environment, said determining being based, at least in part, on one or more of:

crowd-sourced measurements or indications;
detection of a WWAN cell density;
   channel energy or channel impulse responses for signals or GNSS signals;
   a population density map;
   a Wi-Fi access point density map; or
   inspection of imagery features on a digital map.

33. The apparatus of claim 29, and further comprising:
means for determining an estimated distance or time to reach said location of at least one harsh or diminished radio frequency environment; and
means for placing at least one sensor of said one or more sensors into a preparatory condition based, at least in part, on said estimated distance or time.

* * * * *